United States Patent [19]

Murahashi et al.

[11] Patent Number: 5,010,353

[45] Date of Patent: Apr. 23, 1991

[54] LASER RECORDER WITH INTEGRALLY MOLDED DEFLECTOR

[75] Inventors: Takashi Murahashi; Toshihiko Nakazawa; Toshihiro Takesue; Toshihiro Motoi, all of Hachioji, Japan

[73] Assignee: Konica Corporation, Tokyo, Japan

[21] Appl. No.: 490,518

[22] Filed: Mar. 1, 1990

Related U.S. Application Data

[63] Continuation of Ser. No. 203,697, Jun. 7, 1988, abandoned, which is a continuation-in-part of Ser. No. 68,142, Jun. 29, 1987, abandoned.

[30] Foreign Application Priority Data

| Jul. 4, 1986 | [JP] | Japan | 61-158559 |
| May 11, 1987 | [JP] | Japan | 62-113853 |
| Jul. 20, 1987 | [JP] | Japan | 62-181659 |

[51] Int. Cl.$^5$ .............................. H04N 1/21
[52] U.S. Cl. .................... 346/108; 350/6.6
[58] Field of Search ........... 346/76 L, 107 R, 108, 346/160; 350/6.5, 6.7, 6.8; 358/296

[56] References Cited

U.S. PATENT DOCUMENTS

| 3,995,110 | 11/1976 | Starkweather . | |
| 4,421,381 | 12/1983 | Ueda | 350/6.6 |
| 4,687,283 | 8/1987 | Ito | 346/108 |
| 4,707,710 | 11/1987 | Shinada | 346/108 |
| 4,754,291 | 6/1988 | Horikawa | 346/108 |

FOREIGN PATENT DOCUMENTS 2075762 11/1981 United Kingdom .

OTHER PUBLICATIONS

Patent Abstracts of Japan, vol. 7, No. 253 (p. 235) [1398], 11/10/83, JPA 57-19437, 8/16/83, abstract only.

Primary Examiner—Mark J. Reinhart
Attorney, Agent, or Firm—Jordan B. Bierman

[57] ABSTRACT

A laser recording apparatus wherein a laser beam modulated in accordance with image signals and deflected by a deflector having a deflecting element in a predetermined direction scans a recording medium through a beam correcting lens system interposed between the deflector and the recording medium to write in the image signals on the recording medium. The deflecting element of the deflector is molded integrally of a frame, a reflecting mirror, a drive coil and a ligament. The deflecting element is made of a crystal base.

8 Claims, 7 Drawing Sheets

→ MAIN SCANNING DIRECTION

FIG. 6A   FIG. 6B   FIG. 6C   FIG. 6D

→ MAIN SCANNING DIRECTION

LASER RECORDER WITH INTEGRALLY MOLDED DEFLECTOR

This application is a continuation of application Ser. No. 203,697, filed June 7, 1988(now abandoned) which is a continuation in part of copending application Ser. No. 068,142, filed June 29, 1987.

BACKGROUND OF THE INVENTION

1. Field of the Invention

The present invention relates to a laser recording apparatus which is suitably applied to an electrophotographic color reproducing machine or a laser printer.

2. Description of the Prior Art

Some electrophotographic color reproducing machine uses a semiconductor laser as means for forming an electrostatic latent image on a photosensitive image retainer in accordance with image signals corresponding to an original document.

This is because, in case a laser beam scanner is used for color recording, electrostatic images can be easily formed with a displacement for color separated images so that a clear color image can be recorded.

Figure 13:
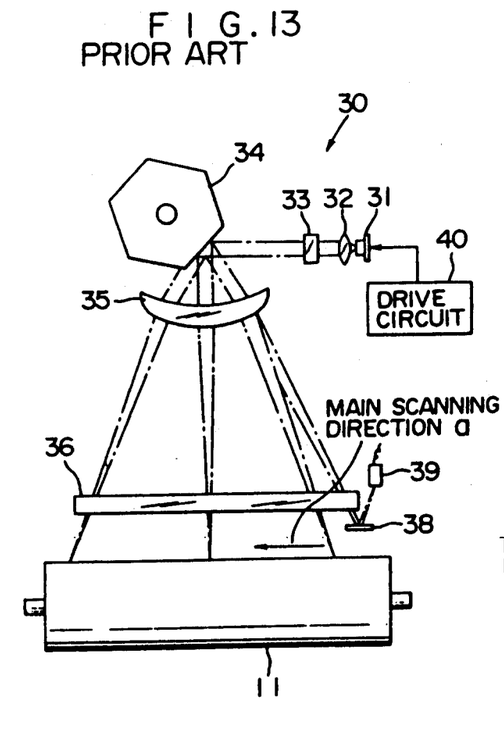
FIG. 13 is a diagram showing the structure of one example of the optical system using a rotary polygon mirror.

FIG. 13 is a schematic view showing the structure of one example of a laser beam scanner to be used of an electrophotographic color copying machine of that type.

In FIG. 13, reference numeral 11 designates a drum-shaped image retainer which is formed on its surface with a photoconductive/photosensitive layer of selenium or the like for forming an electrostatic (latent) image corresponding to an optical image.

The laser beam scanner 30 is equipped with a semiconductor laser 31 which is optically modulated in accordance with modulation signals binary-coded from image informations.

The laser beam emanating from the laser 31 is incident upon a rotary polygon mirror scanner, i.e., a deflector 34 through a collimator lens 32 and a cylindrical lens 33.

The laser beam thus deflected by that deflector 34 illuminates the surface of the image retainer 11 through a focusing f-$\theta$ lens 35 and a cylindrical lens 36.

Thus, the laser beam is deflected by the deflector 34 to scan the surface of the image retainer 11 at a constant rate in a predetermined direction a to effect the image exposure.

Incidentally, reference numeral 39 designates a photosensor for receiving the laser beam reflected by a mirror 38 to generate an index signal indicating the scanning start of the laser beam so that image data of one line are written with reference to that index signal.

The deflector 34 can be exemplified by not only the rotary polygon mirror, as shown, but also a mechanical vibration mirror such as a galvanometer.

An example of the apparatus for scanning with an optical beam by using a mechanical vibration mirror is presented by the galvanometer mirror scanner apparatus, as is disclosed in Japanese Patent Laid-Open No. 60944/1979.

Figure 14:
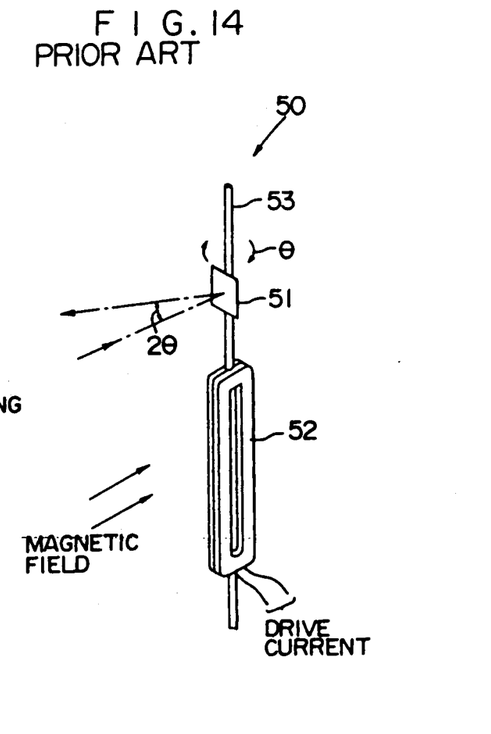
FIG. 14 is a diagram showing the structure of one example of the optical system using a mechanical vibration mirror.

FIG. 14 presents one example of the galvanometer 50.

The galvanometer 50 is composed, as well known in the art, of a reflecting mirror 51, a drive coil 52 and a ligament (i.e., rotary hanging string) for mechanically connecting the reflecting mirror 51 and the drive coil 52. The drive coil 52 is arranged in a fixed external DC magnetic field.

If a drive current of a predetermined frequency is fed to the drive coil 52, a predetermined electromagnetic force acts upon the drive coil 52 to vibrate the reflecting mirror 51.

As a result, if the reflecting mirror 51 is illuminated with the optical signal modulated by the aforementioned image signals, these optical signals are deflected to reach the image retainer 11 so that the optical scanning similar to the above ones are conducted.

Here, in the optical scanning apparatus using the rotary polygon mirror as described above, the deflector invokes the following problems because the polygon mirror is attached to and is rotationally driven by the motor to deflect the laser beam:

(1) The rotary polygon mirror itself is enlarged to cause a bottleneck in reducing the size of the optical scanning apparatus;

(2) The rotational noises of the motor and the wind noises of the rotary polygon mirror grow harsh, while the motor is rotating, so that the noises and vibrations cannot be reduced;

(3) Since the bearing of the drive motor for the rotary polygon mirror of a smaller size is usually of ball type, it will wear after a long use to deteriorate the stability and reliability of the rotations; and (4) Since the ball bearing motor has its driving rate is about 1 kHz in terms of frequency, it cannot stand the use for high-speed scanning.

In case, on the other hand, the bearing is exemplified by a wear-resisting bearing such as air bearing, the machining accuracy required for the shaft and bearing is very severe. If this requirement cannot be met, the shaft will be fixed due to dust. Another problem is that the deflector is large-sized and expensive for the practical use.

Moreover, the rotary polygon mirror may establish noise light in the optical system due to the optical scatter on its reflecting surface. The extent of this optical scatter depends upon the surface accuracy and the coating material of the reflecting surface. No matter whether the scatter extent is more or less, the noise light is established to illuminate the image retainer 11 thereby to adversely affect the final image.

This causes the fogging of the image and the reduction in reproducibility of a thin line. This raises an innegligible problem for the laser recording apparatus which is required to have a high quality and a high resolution as high as 12 to 24 dots/mm.

In case, on the contrary, the mechanical vibration mirror shown in FIG. 14 is used as the deflector, the reflecting mirror 51 and the drive coil 52 are fabricated separately, and the ligament 53 is attached so that the individual parts are enlarged in addition to the following drawbacks:

(1) Since the ligament is made of a metal, the mirror is difficult to turn over a wide range; and (2) Because of the metallic material, moreover, the ligament will experience the metallic fatigue after a long use so that stable vibrations cannot be obtained.

In case, moreover, the ligament, the mirror and the frame supporting them are made of different materials, the accordingly different coefficients of linear expansion may make it difficult to support and vibrate the mirror stably if the ambient temperature and the environmental condition drastically change. This instability in the mirror support and vibrations will adversely affect the quality of the final image as in a laser beam printer or a facsimile demanding a high-speed scanning.

This is because the position of the beam spot to hit the image retainer 11 is not fixed as a result of the movement of the mirror during the beam scanning. As a result, a straight line may be curved, or the equal distance between lines may become irregular.

As has been described hereinbefore, the laser recording apparatus has a high production cost and a short lifetime because it uses the rotary polygon mirror or the mechanical vibration mirror as the deflector. As a result, a number of drawbacks such as reductions in the reliability of the recording apparatus and in the recording quality are invoked.

If a quartz deflector is used as the deflector, on the other hand, it receives a predetermined electromagnetic force, if its drive coil is supplied with an AC signal of a predetermined frequency, so that the reflecting mirror is vibrated at a predetermined angle with a predetermined frequency.

As a result, a laser beam is deflected if it is modulated for illumination by image signals so that an electrostatic image corresponding to the image informations can be formed on an image retainer by focusing the deflected laser beam on the image retainer.

Especially in case the quartz deflector molded integrally with the base is used as the deflector, as described above, it has a strength to endure a high torsional moment.

As a result, if the drive coil of this deflector is supplied with an AC signal for effecting vibrations in or in the vicinity of a frequency intrinsic to the deflector, the reflecting mirror of the deflector will be vibrated uniformly and stably at a desired rotational angle and in a predetermined frequency.

However, this structure is developed essentially for an electromagnetic oscillograph so that it generally has a small deflection angle and a small frequency.

It has therefore been accepted to be difficult that such deflector is applied to a small-sized high-speed laser printer.

After a variety of investigations, we have found that a printer having high stability, durability and image quality despite of possibility of high-speed scanning can be provided contrary to our expectations by using that deflector under specified conditions and with proper controls.

SUMMARY OF THE INVENTION

An object of the present invention is to provide a laser recording apparatus which is small-sized and highly reliable and has a high image quality while clearing all the drawbacks of the prior art.

The above-specified object of the present invention can be achieved by a laser recording apparatus comprising: a deflector having a deflecting element for deflecting in a predetermined direction a laser beam modulated in accordance with image signals; and a beam correcting lens system interposed between said deflecting and a recording medium, so that said laser beam deflected by said deflector scans said recording medium through said lens system to write in said image signals, wherein the improvement resides in that the deflecting element of said deflector is molded integrally of a frame, a reflecting mirror, a drive coil and a ligament.

Incidentally, the deflecting element may be made of quartz.

This deflecting element can be fabricated, for example, by the method which is disclosed in Japanese Patent Publication No. 57052/1985 or 57053/1985, or "Quartz Optical Deflecting Element" (pp 657 and 658) of the preparatory papers of 20th SICE Lecture Meeting in July, 1981.

Other objects and features of the present invention will become apparent from the following description taken with reference to the accompanying drawings.

DESCRIPTION OF THE PREFERRED EMBODIMENTS

The laser recording apparatus according to the present invention will be described in detail with reference to FIG. 1 in case it is applied to the aforementioned simple color image recording apparatus.

Figure 1:
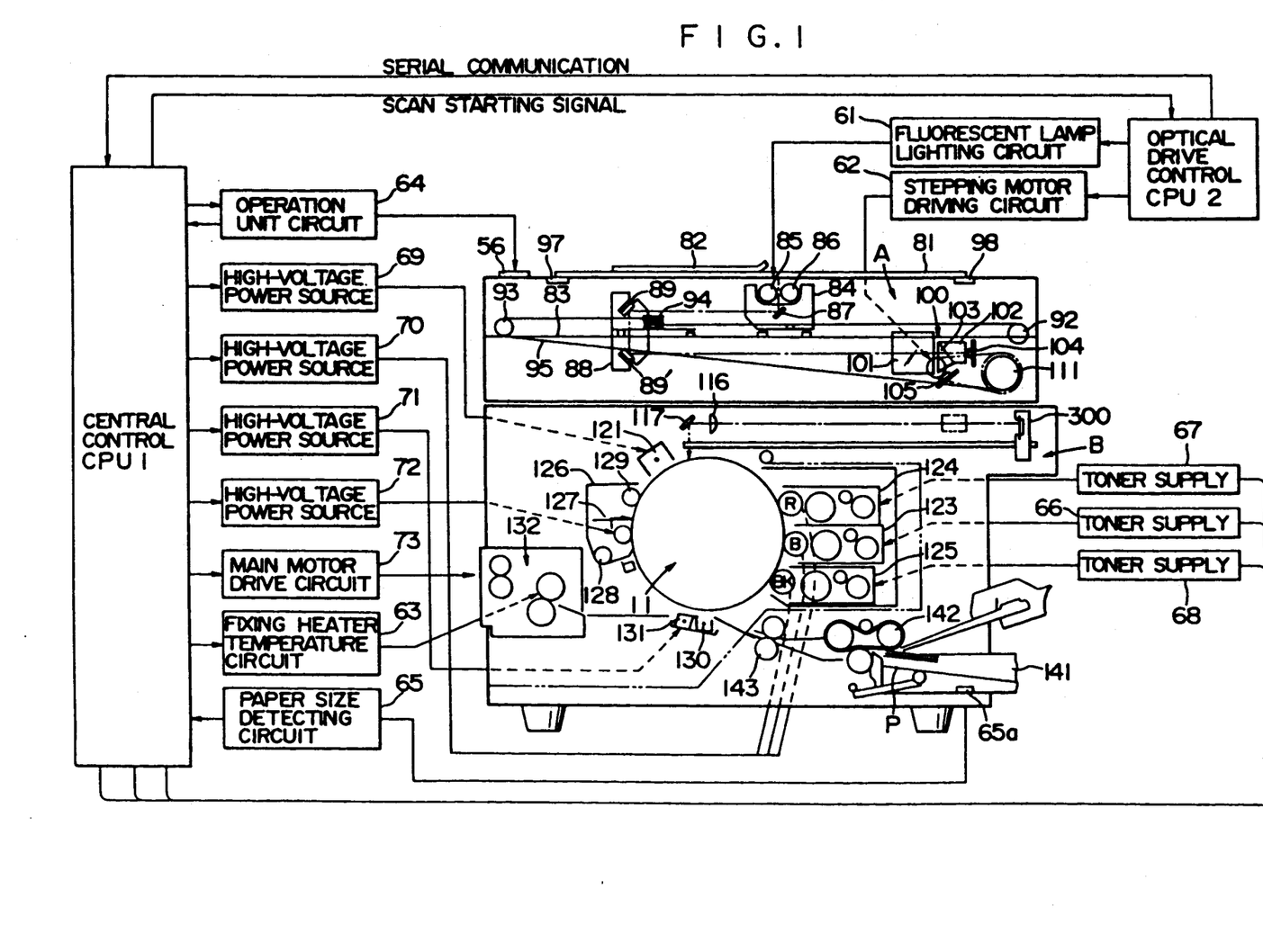
FIG. 1 is a schematic diagram showing the structure of an essential portion of one example of laser recording apparatus according to the present invention, in which the apparatus is applied to a color image recording apparatus.

FIG. 1 is a schematic diagram showing the structure of the laser recording apparatus according to the present invention and the control system thereof. A color original is separated into two red and cyan colors, which are incident upon a photoelectric converting element such as CCD so that the color original is photoelectrically converted. These electric signals are converted into digital signals of a predetermined bit number for color separations.

In this embodiment, the color separations generate three color signals of red, blue and black colors.

These individual color signals thus separated are written in an image retainer 11 through a write unit B using a semiconductor laser beam to form electrostatic images. Then, these electrostatic images are developed to form color toner images by developing devices corresponding to those color signals.

These developing processes are repeated for the individual color signals to form either a monochromatic toner image or a multi-color toner image, on which the individual color toner images are superposed, on the image retainer. This multi-color or monochromatic toner image is transferred to and fixed on a sheet of recording paper.

Now, by operating the copy button of a control panel 56, the corresponding data are introduced through an operation circuit 64 to a central control CPU 1. A scan starting signal thus obtained for starting the scan of the original is sent out to an optical drive CPU 2 connected in serial communication with the CPU 1, to drive an original read unit A connected electrically with the CPU 2.

First of all, an original 82 on a platen glass 81 is optically scanned by an optical system.

This optical system is constructed of: a carriage 84 carrying fluorescent lamps 85 and 86 and a reflecting mirror 87; and a moving mirror unit 88 equipped with V mirrors 89 and 89'.

The carriage 84 and the moving mirror unit 88 are driven to run on slide rails 83 at predetermined velocities and in predetermined directions, respectively, by a stepping motor 90.

The optical (image) informations thus obtained by illuminating the original 82 by the fluorescent lamps 85 and 86 are introduced through the reflecting mirror 87 and the V mirrors 89 and 89' into an optical information conversion unit 100.

Incidentally, in order to prevent the optical emphasis and decay of a specified color when in the optical scan of a color original, commercially available warm and white fluorescent lamps are used as the fluorescent lamps 85 and 86. In order to prevent the flickering, moreover, these fluorescent lamps 85 and 86 are lit and driven by a high-frequency power source of about 40 kHz. In order to maintain the tube wall at a constant temperature or to promote its warm-up, on the other hand, the fluorescent lamps 85 and 86 are heated by a heater using a posistor.

The platen glass 81 is equipped at the two ends of its back with reference white plates 97 and 98, which are optically scanned to normalize the image signals into white signals.

The optical information conversion unit 100 is composed of a lens 101, a prism 102, a dichroic mirror 103, a CCD 104 to be projected with a separated red image, and a CCD 105 to be projected with a separated cyan image.

The optical signals generated by the optical system are focused by the lens 101 so that they are separated into red and cyan optical informations by the dichroic mirror 103 disposed in the prism 102.

The individual separated color images are focused on the receiving surfaces of the corresponding CCDs 104 and 105 to generate image signals converted into the electric signals. These image signals are processed by signal processing means so that the individual color signals are then outputted to the write unit B.

This signal processing means includes a signal processing circuit such as arithmetic processing means, color separating means or binary coding means in addition to A/D conversion means, although not shown.

The write unit B includes a deflector 300 composed of a deflecting element using quartz, as will be described hereinafter, so that the laser beam modulated by the color signals are deflected and scanned by this deflector 300.

When the deflecting scan is started, the scanning beam is detected by a laser beam index sensor (although not shown) to start the beam modulation with a first color signal (e.g., a blue color signal). The beam thus modulated scans the image retainer 11 which has been uniformly charged by a charging device 121 supplied with a predetermined high voltage from a high-voltage power source 69.

As a result, an electrostatic image corresponding to the first color signals is formed on the image retainer 11 by the main scan of the laser beam and the auxiliary scan of the rotations of the image retainer 11.

This electrostatic image is developed by a developing device 123 containing a blue toner. A predetermined bias voltage is applied to the developing device 123 from the high-voltage power source 70. This development forms a blue toner image.

Incidentally, the toner supply to the developing device 123 is conducted, if necessary, by controlling toner supply means 66 in response to a command signal from the CPU 1.

The blue toner image is rotated while being released from the pressure of a cleaning blade 127 so that an electrostatic image is formed in accordance with second color signals (e.g., red signals) like the case of the first color signals. This electrostatic image is developed to form a red toner image by using a developing device 124 containing a red toner.

It goes without saying that a predetermined bias voltage is applied from a high-voltage power source 70 to the developing device 124.

Likewise, an electrostatic image is formed in accordance with third color signals (e.g., black signals) and is developed by a developing device 125 filled with a black toner. As a result, multi-color toner images are written on the image retainer 11.

Incidentally, the description thus far made is directed to the formation of the trichromatic images. It is, however, natural that a dichroic or monochromatic image can be formed.

As the developing process, there has been exemplified the so-called "non-contact development", in which the individual toners are scattered for developments toward the image retainer 11 while the AC and DC bias voltages being applied from the high-voltage power source 70, as has been described hereinbefore.

Predetermined quantities of toners are supplied to the developing devices 124 and 125 by driving toner supply means 67 and 68 in response to the command signals from the CPU 1, as has been described hereinbefore.

In this meanwhile, a sheet of recording paper P is fed from a paper feeding device 141 through feed rolls 142 and timing rolls 143 onto the surface of the image retainer 11 while being timed with the rotations of the image retainer 11. The multi-color images are transferred by a transfer electrode 130 supplied with a high voltage from a high-voltage power supply 71 and are separated by a separating electrode 131.

The recording paper P thus separated is transported to and fixed by a fixing device 132 (which is always controlled to a predetermined temperature by a fixing heater temperature control circuit 63) to form a color image.

The image retainer 11 thus having its images transferred is cleaned by a cleaning device 126 so that it may be prepared for a subsequent image forming process.

In the cleaning device 126, a predetermined DC voltage is applied from a high-voltage power source 72 to a metal roll 128 disposed upstream of a blade 127 so as to facilitate recovery of the toner cleaned by the blade 127. The metal roll 128 is disposed out of contact with the surface of the image retainer 11.

The blade 127 is released from the pressure at the end of the cleaning operation. In order to remove the unnecessary toner to be left after the release, an auxiliary cleaning roller 129 is also provided and is rotated in a forced contact in the direction opposite to that of the image retainer to clean off and remove the unnecessary toner sufficiently.

Incidentally, in FIG. 1, a lighting control circuit 61 for driving the fluorescent lamps 85 and 86 is controlled in response to the command signal coming from the CPU 2. Likewise, the stepping motor 90 also has its drive circuit 62 controlled in response to the command signal of the CPU 2.

The paper feeding device 141 is equipped with a sensor 65a, the output of which is fed to a paper size detecting circuit 65, the output of which is further fed to the CPU 1.

Incidentally, the present invention can also be applied to the laser recording apparatus other than that shown in FIG. 1.

For example, the present invention can naturally be applied to the developing device which is disclosed in Japanese Patent Laid-Open No. 176069/1985 proposed previously.

The schematic structure of the essential portion of the laser recording apparatus according to the present invention has been described hereinbefore. Next, the structures of the individual units will be described in detail in the following with reference to FIG. 2.

Figure 2:
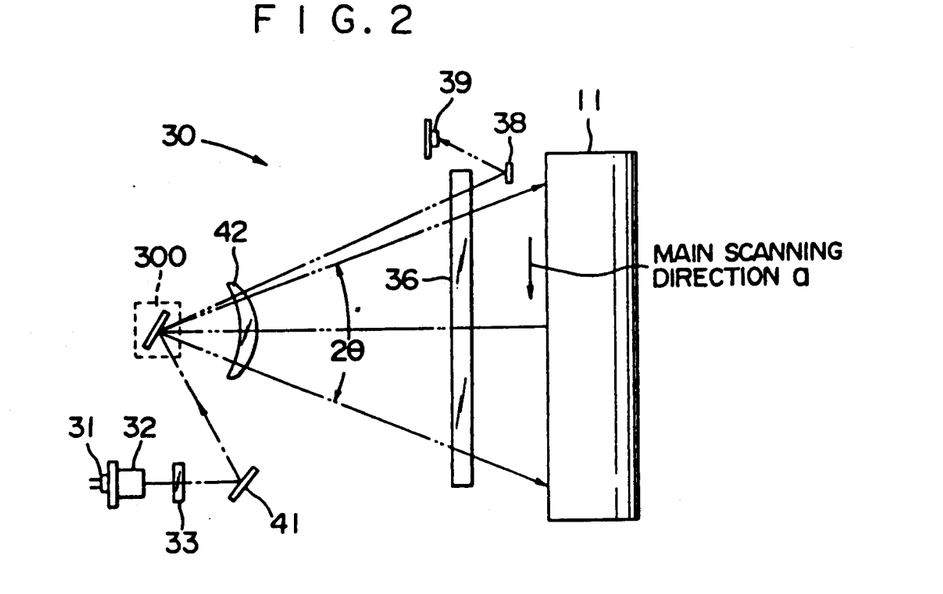
FIG. 2 is a schematic diagram showing an essential portion of an optical system using an optical deflector.

FIG. 2 shows a more specific relations of an optical scanning system to be used with the laser recording apparatus described above.

The laser beam emitted from the semiconductor laser 31 has its shape corrected by the collimator lens 32 is introduced into the deflector 300 through the cylindrical lens 33 and a reflecting mirror 41. As a result, the laser beam is deflected in a predetermined direction at a predetermined rate by the action of the deflector 300, and the lens 32 and 33 are used as a beam correcting system.

The laser beam thus deflected is focused on the image retainer 11 through a scanning lens 42 and the cylindrical lens 36 to form an electrostatic image.

The cylindrical lenses 33 and 36 are used to correct the vertical deflection, if any, of a (later-described) reflecting mirror to be disposed in the deflector 300.

Here, one cylindrical lens 36 can be made of plastics. In the case of this plastic lens, its superficial shape can be designed relatively simply to the optimum one so that the performance of the whole optical system can advantageously be improved.

If the deflection of the reflecting mirror is very small, on the contrary, the aforementioned cylindrical lenses 33 and 36 can be dispensed with.

The scanning lens 42 is used for focusing the laser beam correctly on the surface of the image retainer 11 and for enabling the laser beam to scan the image retainer 11 at a uniform rate.

Here, in case the reflecting mirror is oscillated with a frequency intrinsic to the deflector 300, it performs sinusoidal motions at the following deflection angle $\theta$.

$$\theta = A \sin \omega t,$$

wherein:
 A: Maximum deflection angle of the reflecting mirror;
 $\omega$: Angular velocity; and
 t: Time.

Therefore, the scanning lens 42 is given the following characteristics if the spot position of the laser beam is expressed by a function $X(\theta)$ of $\theta$:

$$X(\theta) = A \cdot f \cdot \arcsin(\theta/A),$$

wherein:
 f: Focal length of scanning lens 42.

From this equation, the spot position of the laser beam on the image retainer 11 is expressed by the following equation if it is expressed by a function $X(t)$ of the time t:

$$X(t) = A \cdot f \cdot \omega t.$$

This implies that conversion into a uniform motion can be accomplished by the use of that scanning lens 42, as described above. An image quality without distorsion can be formed in case the electrostatic image is formed by the uniform motion.

Figure 3:
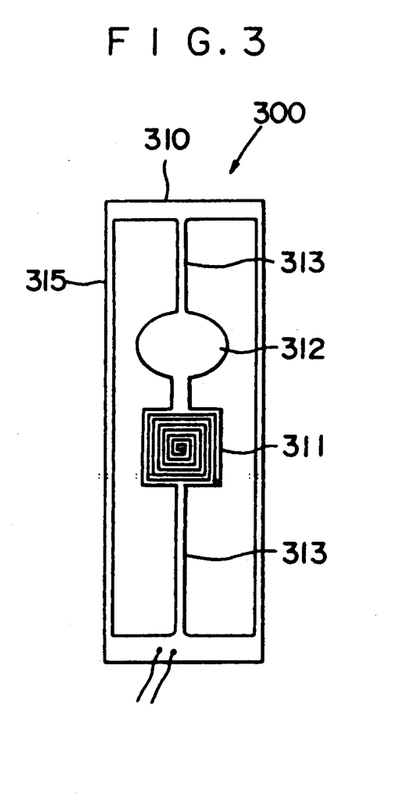
FIGS. 3 and 4 are diagrams showing one example of an optical deflecting element.
Figure 4:
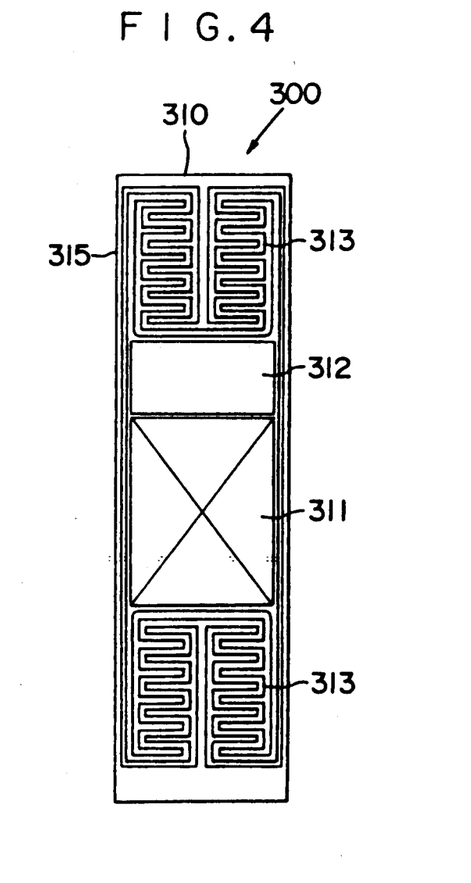

The deflector 300 to be used in this optical scanning system can be exemplified by that using a deflecting element, as shown in FIGS. 3 or 4.

Turning now to FIG. 3, the deflector 300 is constructed of an elongated frame 315 having a generally rectangular shape. This frame 315 is equipped at its central portion with a drive coil 311 and at its upper portion with a reflecting mirror 312. A ligament 313 acting as a rotary rod is extended between the reflecting mirror 312 and the frame 315.

Another ligament 313 is also extended from the drive coil 311.

Thus, a deflecting element 310 is formed integrally with the drive coil 311, the reflecting mirror 312 and the rotary ligaments 313.

The frame 315 can be made of a material such as rock crystal, glass or quartz, which is liable to be etched and having a large modulus of elasticity.

The embodiment uses the crystal. In this case, the crystal base used as the deflecting element 310 is desired to have a thickness of 0.1 to 0.5 mm because if it is the thicker it can have the higher natural frequency but it has the more difficulty in machining and the smaller angle of deflection.

In case the deflecting element 310 is to be formed in the frame 315, it is usually made by the photolithography and the etching technique so that it can be finely machined. The deflecting element 310 thus etched is usually plated with chromium and then silver so as to drop its electric resistance.

On the other hand, especially in case the semiconductor laser is used as the light source, the reflecting mirror 312 is plated with gold, copper or aluminum so as to raise its reflectivity. The reflecting mirror 312 may be coated with a protective film of SiO or $SiO_2$ after the plating treatment so that its surface may be prevented from being damaged or oxidized.

The reflecting mirror 312 to be used may have the shapes selected as follows.

Figure 5A:
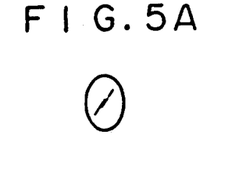
FIGS. 5A and 5B are explanatory diagrams showing the shapes of dots of a laser beam.
Figure 5B:
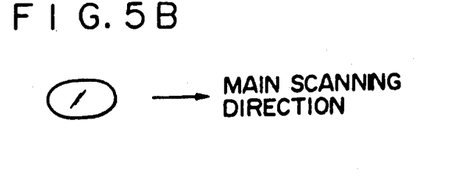

Specifically, the laser beam having passed through the collimator lens 32 is formed into the shape shown in FIG. 5A. This shape is deformed into a transversely elongated elliptical shape, as shown in FIG. 5B, after the laser beam has passed through the cylindrical lens 33. This indicates that the reflecting mirror 312 to be used may have a rectangular shape elongated in the main scanning direction.

Figure 6A:
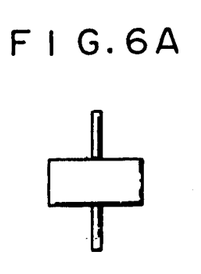
FIGS. 6A to 6D are explanatory diagrams showing the shapes of a reflecting mirror.
Figure 6B:
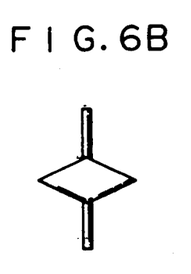
Figure 6C:
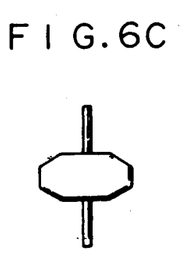

From this viewpoint, the reflecting mirror 312 may take a variety of shapes, as shown in FIGS. 6A to 6D. FIG. 6A represents a rectangular shape; FIG. 6B a rhombic shape; FIG. 6C a rectangular having its four corners cut off; and FIG. 6D a transversely elongated ellipse.

Figure 6D:
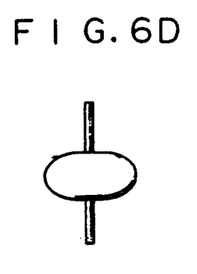

In case the reflecting mirror 312 is to be oscillated at a high speed, an air resistance is a serious problem. In this case, the reflecting mirror may advantageously take the elliptical shape shown at D in FIG. 6.

The optimum length of the reflecting mirror 312 in the transverse direction thereof is varied depending upon the focal length of the scanning lens 42, the diameter of the beam spot focused on the image retainer 11 or the scanning range on the image retainer 11.

Figure 15:
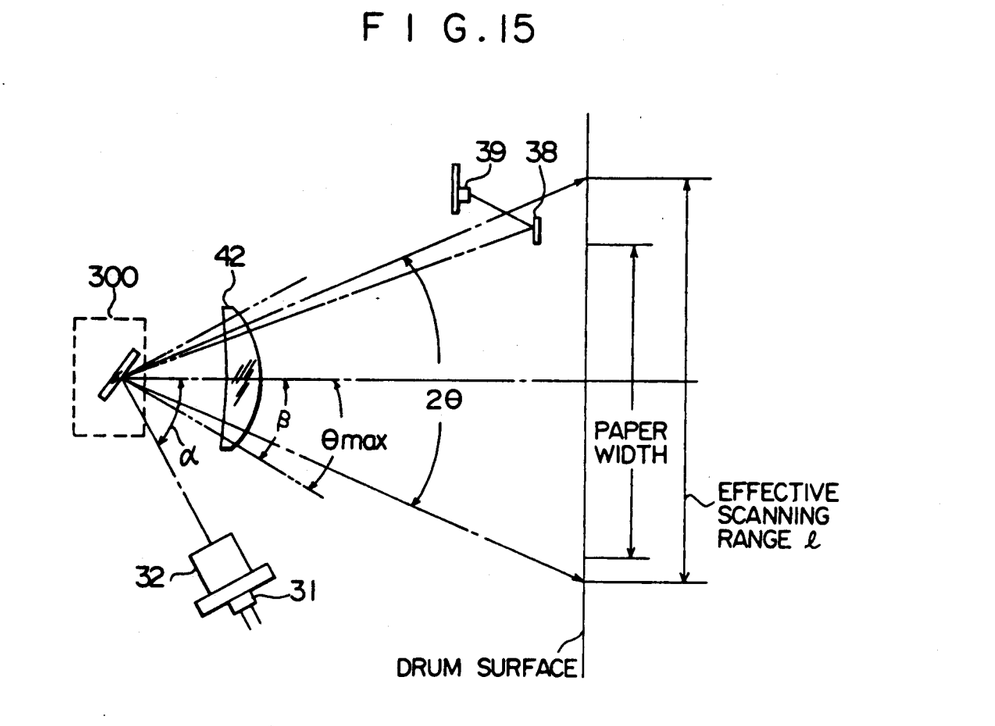
FIG. 15 is a diagram showing an optical scanning system.

The length D of the reflecting mirror 312 in the transverse direction thereof is determined by the following formula:

$$D \geq 1.64 \times \{\lambda F/d \cos(l/4F + \alpha/2)\}$$

where $\lambda$ is a wavelength of laser and the range of the wavelength $\lambda$ is selected as $$750\ nm \leq \lambda \leq 820\ nm$$

d is the diameter of the laser beam on the image retainer in the main scanning direction (transverse direction) and selected with reference to the resolving power etc. as $$30\ \mu m \leq d \leq 150\ \mu m;$$

l is an effective scanning range on the image retainer (see FIG. 15);

In case that an increment of the scanning range with respect to the index sensor is 30 mm, and the recording size is from B5 to A3, that is, 182 mm, 297 mm, l is selected as $$210\ mm \leq l \leq 330\ mm;$$

$\alpha$ is an angle of incident beam to the reflecting mirror 312 with respect to the optical axis of the reflected beam and if this value is small, the size of the reflecting mirror 312 can be made small.

As apparent from FIG. 15, in case that $\theta$ is one half of the deflection angle of the reflected beam from the reflecting mirror 312 and $\theta max$ is one half of the deflection angle of the reflected beam corresponding to the maximum effective scanning range, it is preferable that the angle $\alpha$ is selected as $$\theta max \leq \alpha \leq \pi/2.$$

The lower limit of the focal length F of the scanning lens 42 is determined by the effective scanning range l, so that it becomes $$F\theta \geq l.$$

As shown in FIG. 15, the maximum value of $\theta$ is determined by the maximum scanning angle $\beta$ of the scanning lens 42, so that the relation between the two is expressed as $$\theta = 2\beta.$$

If the maximum scanning angle $\beta$ of the scanning lens 42 is too large, the design and manufacturing thereof become difficult and thus the cost becomes high. Accordingly, it is economical to select the $\beta$ as $$\beta \leq \pi/3.$$

It is preferable to select the upper limit of the focal length F according to the size of the optical system which is suitable for the laser recording apparatus as $$F \leq 500\ mm$$

and thus $$(3/2)\pi l \leq F \leq 500\ mm.$$

As stated above, the length D of the reflecting mirror 312 in the transverse direction thereof is determined to a required enough value according to the focal length of the scanning lens 42, the diameter of the beam spot focused on the image retainer 11 or the scanning range on the image retainer 11.

The length of the reflecting mirror 312 in the longitudinal direction (sub-scanning direction) is selected to a value equal to or smaller than the length D in the transverse direction. Accordingly, if it is selected to a fraction of the length D, for example, the shape of the reflecting mirror 312 is shown in FIG. 3.

The concrete values of the length D corresponding to the change of the focal length F of the scanning lens 42 are shown in Tables 1 and 2 under the following conditions:
 1. $\alpha = 60°$
 2. $\lambda = 750$ nm, 780 nm, 820 nm
 3. recording paper size = A4, A3
 4. recording density
    240 dot/inch (d = 106 $\mu$m)
    300 dot/inch (d = 85 $\mu$m)
    400 dot/inch (d = 64 $\mu$m)
    480 dot/inch (d = 53 $\mu$m).

The values shown in the Tables 1 and 2 can be simplified as shown in Table 3.

It is better to vary the recording density (dot density) according to the specified magnification rate, if the magnification processing is taken into consideration. The optimum length D is shown in Table 4, if the recording density is taken into consideration.

TABLE 1

| F (mm) | dot density (beam size) | | | | | | | | | | | | deflection angle 2θ (degree) |
|---|---|---|---|---|---|---|---|---|---|---|---|---|---|
| | 240 dot/inch | | | 300 dot/inch | | | 7400 dot/inch | | | 7480 dot/inch | | | |
| | 780 nm | 750 nm | 820 nm | 780 nm | 750 nm | 820 nm | 780 nm | 750 nm | 820 nm | 780 nm | 750 nm | 820 nm | |
| 100 | 2.80 | 2.69 | 2.94 | 3.49 | 3.36 | 3.67 | 4.66 | 4.48 | 4.90 | 5.59 | 5.38 | 5.88 | 138 |
| 115 | 2.77 | 2.66 | 2.91 | 3.46 | 3.33 | 3.64 | 4.62 | 4.44 | 4.86 | 5.54 | 5.33 | 5.83 | 120 |
| 150 | 3.01 | 2.89 | 3.16 | 3.76 | 3.61 | 3.95 | 5.01 | 4.82 | 5.27 | 6.01 | 5.78 | 6.32 | 92 |
| 200 | 3.55 | 3.42 | 3.74 | 4.45 | 4.27 | 4.67 | 5.93 | 5.70 | 6.23 | 7.11 | 6.84 | 7.48 | 69 |
| 250 | 4.18 | 4.02 | 4.40 | 5.23 | 5.03 | 5.49 | 6.97 | 6.70 | 7.33 | 8.37 | 8.05 | 8.80 | 55 |
| 300 | 4.84 | 4.65 | 5.09 | 6.05 | 5.81 | 6.36 | 8.06 | 7.75 | 8.48 | 9.68 | 9.30 | 10.18 | 46 |
| 350 | 5.51 | 5.30 | 5.79 | 6.89 | 6.62 | 7.24 | 9.18 | 8.83 | 9.65 | 11.02 | 10.60 | 11.58 | 40 |
| 400 | 6.19 | 5.95 | 6.50 | 7.73 | 7.43 | 8.13 | 10.31 | 9.91 | 10.84 | 12.37 | 11.90 | 13.01 | 35 |
| 450 | 6.87 | 6.60 | 7.22 | 8.59 | 8.25 | 9.02 | 11.45 | 11.01 | 12.03 | 13.74 | 13.21 | 14.45 | 31 |
| 500 | 7.56 | 7.26 | 7.94 | 9.44 | 9.08 | 9.92 | 12.59 | 12.11 | 13.24 | 15.11 | 14.53 | 15.88 | 28 |

[unit: mm 1 = 240(A4) λ = η/3 (rad)]

TABLE 2

| F (mm) | dot density (beam size) | | | | | | | | | | | | deflection angle 2θ (degree) |
|---|---|---|---|---|---|---|---|---|---|---|---|---|---|
| | 240 dot/inch | | | 300 dot/inch | | | 7400 dot/inch | | | 7480 dot/inch | | | |
| | 780 nm | 750 nm | 820 nm | 780 nm | 750 nm | 820 nm | 780 nm | 750 nm | 820 nm | 780 nm | 750 nm | 820 nm | |
| 100 | 5.48 | 5.27 | 5.77 | 6.85 | 6.59 | 7.20 | 9.14 | 8.79 | 9.61 | 10.97 | 10.55 | 11.54 | 190 |
| 150 | 3.80 | 3.66 | 4.00 | 4.75 | 4.57 | 4.99 | 6.33 | 6.09 | 6.60 | 7.60 | 7.31 | 7.99 | 127 |
| 158 | 3.81 | 3.66 | 4.01 | 4.76 | 4.58 | 5.00 | 6.35 | 6.11 | 6.68 | 7.62 | 7.33 | 8.01 | 120 |
| 200 | 4.08 | 3.92 | 4.29 | 5.09 | 4.90 | 5.36 | 6.79 | 6.53 | 7.14 | 8.15 | 7.84 | 8.57 | 95 |
| 250 | 4.60 | 4.42 | 4.83 | 5.74 | 5.52 | 6.04 | 7.66 | 7.37 | 8.06 | 9.19 | 8.84 | 9.67 | 76 |
| 300 | 5.20 | 5.00 | 5.46 | 6.49 | 6.24 | 6.83 | 8.66 | 8.33 | 9.11 | 10.39 | 10.00 | 10.93 | 63 |
| 350 | 5.83 | 5.61 | 6.13 | 7.29 | 7.01 | 7.66 | 9.72 | 9.35 | 10.22 | 11.67 | 11.22 | 12.27 | 54 |
| 400 | 6.49 | 6.24 | 6.82 | 8.11 | 7.79 | 8.52 | 10.81 | 10.40 | 11.37 | 12.97 | 12.48 | 13.64 | 48 |
| 450 | 7.15 | 6.88 | 7.52 | 8.94 | 8.59 | 9.40 | 11.92 | 11.46 | 12.53 | 14.31 | 13.76 | 15.05 | 42 |
| 500 | 7.88 | 7.53 | 8.23 | 9.78 | 9.40 | 10.28 | 13.04 | 12.54 | 13.71 | 15.63 | 15.06 | 16.46 | 38 |

[unit: mm 1 = 330(A3) λ = η/3 (rad)]

TABLE 3

| paper size | dot density | | | |
|---|---|---|---|---|
| | 240 dot/inch | 300 dot/inch | 400 dot/inch | 480 dot/inch |
| B5 | 3~8 | 4~10 | 5~14 | 5~16 |
| A4 | 3~8 | 4~10 | 5~14 | 6~16 |
| B4 | 4~9 | 5~11 | 7~14 | 7~17 |
| A3 | 4~9 | 5~11 | 7~14 | 7~17 |

Unit length of D: mm

TABLE 4

| paper size | dot density | | | | | |
|---|---|---|---|---|---|---|
| | 240~300 dot/inch | 300~400 dot/inch | 400~480 dot/inch | 240~400 dot/inch | 300~480 dot/inch | 240~480 dot/inch |
| B5 | 4~8 | 5~10 | 5~14 | 5~8 | 5~10 | 5~8 |
| A4 | 4~8 | 5~10 | 6~14 | 5~8 | 6~10 | 6~8 |
| B4 | 5~9 | 6~11 | 7~14 | 6~9 | 7~11 | 7~9 |
| A3 | 5~9 | 7~11 | 7~14 | 7~9 | 7~11 | 7~9 |

Unit length of D: mm

The transverse length of the reflecting mirror 312 has a desirable value of 3 to 10 mm, preferably, depending upon the focal length of the scanning lens 42, the diameter of the beam spot focused on the image retainer 11 or the scanning range on the image retainer 11.

As stated above, if the length D of the reflecting mirror 312 in the transverse direction is select by taken the focal length of the scanning lens 42, the diameter of the beam spot focused on the image retainer 11 or the scanning range on the image retainer 11 into consideration, the optical deflector of the optimum size, which is matched to the property of the recording apparatus can be obtained. Accordingly, the reflecting mirror is prevented from becoming too large or too small in size, so that an economical and effective optical deflector 310 can be composed.

Figure 17A:
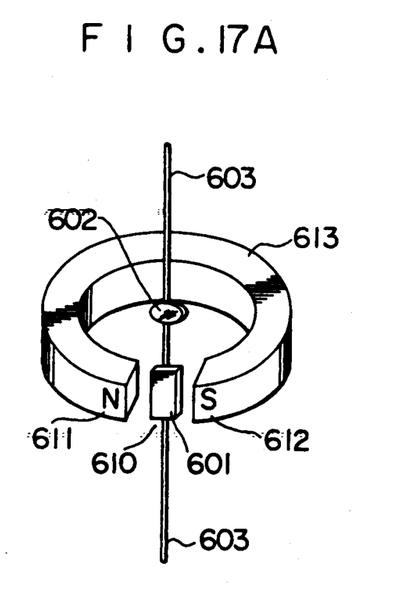
FIGS. 17A and 17B are diagrams of examples of a magnet for driving the deflector.
Figure 17B:
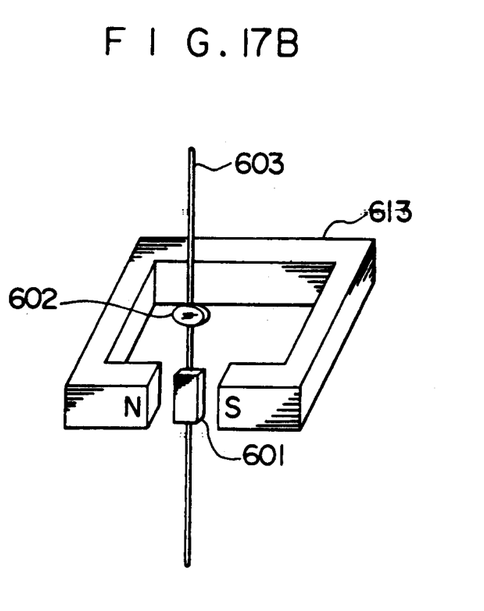

A coil 601 of the optical deflector of the present invention is arranged in a uniform magnetic field 610 formed by N pole 611 and S pole 612 of a permanent magnet. When a sinusoidal wave electric signal is applied to said coil 601, the coil 601 is oscillated with a mirror 602 connected thereto, so that the laser beam is deflected for scanning. In order to form said uniform magnetic field 610, the N pole 611 and the S pole 612 can be formed by individual strong magnets, respectively. As shown in FIGS. 17A and 17B, a permanent magnet 613 for forming a magnetic field of a closed loop can be used. In such case, a uniform magnetic field effective to the coil 601 can be formed without causing any leakage magnetic flux. This is an efficient manner of use of the magnet, and the magnetic field 610 in which a sufficient effect is derived from the coil 601 can be obtained even if a permanent magnet of small magnetic force is used. It is easy to form in any shape as shown in FIG. 17B the magnet by using normal materials, such as alnico, ferrite or rare earth elements. When a sinusoidal wave electric signal is applied to the coil 601, the mirror 602 is oscillated around a ligament 603, so that the scanning of the laser beam is effected. The deflecting device as mentioned above can be driven at a high speed and with a small electric power, if it is driven by a resonance frequency of the natural oscillation thereof.

Figure 7:
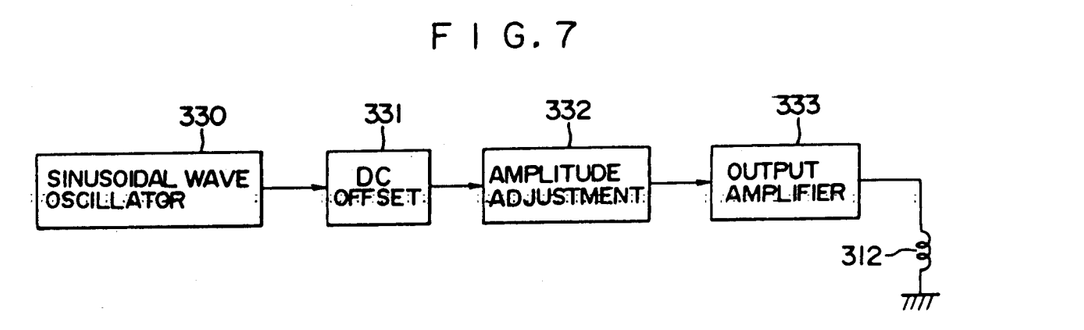
FIG. 7 is a system diagram showing one example of a reflecting mirror drive circuit.

The drive frequency, with which the deflecting element 310 is to be oscillated, is automatically equal to the frequency natural to the deflecting element 310 in case the drive circuit system is a self-resonant circuit. In the case of an external drive source, however, the drive frequency is set as follows, as shown in FIG. 7.

First of all, the structure of the drive circuit system shown in FIG. 7 will be described in the following. Reference numeral 330 appearing in FIG. 7 designates a sinusoidal wave oscillator which is exemplified by an oscillator using an RC circuit or a quartz oscillating element.

In case the quartz oscillating element is used, its natural frequency is divided into a predetermined value and is formed into a sinusoidal shape by a low-pass filter.

Here, the oscillatory frequency, i.e., the drive frequency for the drive coil 311 will be described in the following.

Figure 8:
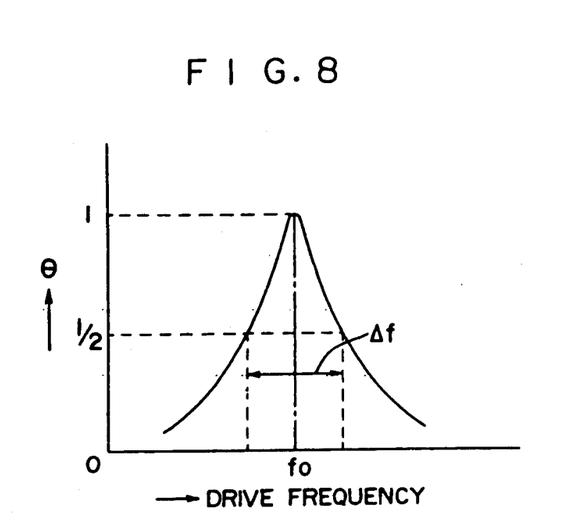
FIG. 8 is a diagram showing the resonance characteristics of the deflecting element.

The deflecting element 310 has the natural frequency, as described above, and the resonance characteristics of the deflection angle $\theta$ with respect to that natural frequency are shown in FIG. 8.

As is apparent from the resonance characteristics of FIG. 8, the efficiency of the deflection angle to an input current drops if the drive is to be made with a frequency deviated from an natural frequency $f_0$. In order to obtain a deflection angle $\theta$ equal to that in case the oscillations are effected with the natural frequency, a remarkably high input current is required.

If, however, an excessively high input current is fed to the drive coil 311, this coil may possibly be burned to cause a trouble. This makes it impossible to use such high current as the drive current.

On the other hand, the natural frequency of the deflecting element 310 may disperse. In this possible case, the drive frequency f of the drive coil 311 is desirably expressed by the following equation so as integrate the vibration frequency, even in case the drive coil 311 is to be driven by a frequency other than the natural one:

$$|f - f_0| \leq f_0/Q$$

wherein:

$f_0$: Natural frequency; and

Q: Sharpness of resonance of resonance characteristics.

From these considerations, the frequency of the sinusoidal wave oscillator 330 is set within a range satisfying the above-specified equation.

The output of the sinusoidal oscillator 330, i.e., the drive frequency is fed to a subsequent offset adjustor 331 to adjust its DC offset.

Figure 9:
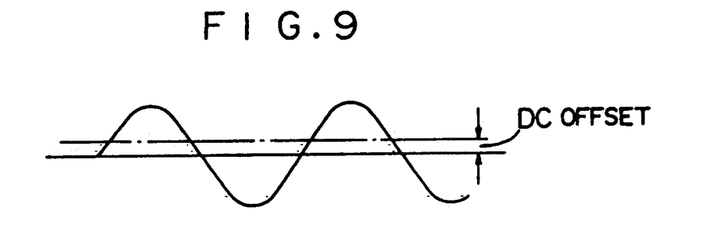
FIG. 9 is a diagram for explaining a DC offset.

If the deflector 300 is disposed in the optical scanning system but out of the designed position, as shown in FIG. 9, the transverse deflections can be adjusted by adjusting the DC level (as indicated by a single-dotted line) of the drive frequency.

Thus, in the offset adjustor 331, the scanning position of the image retainer 1 is brought to the specified scanning position by adjusting the DC level of the adjustor 331.

The drive signal having its offset adjusted has its scanning range adjusted in an amplitude adjustor 332.

This adjustment is made by using the method disclosed in Japanese Patent Publication No. 53855/1985, for example.

This method is used to adjust the deflection angle of the deflector 300. In this case, the scanning range can always be controlled to a constant value by detecting the scanning range on the image retainer 11 to adjust the amplitude of the amplitude adjustor 332 with the detected output.

The drive signal having its DC offset and amplitude adjusted is fed through an output amplifier 333 to the aforementioned drive coil 311.

TABLE 5

|  | Type I | Type II |
| --- | --- | --- |
| Recording Speed | 65 mm/sec | 230 mm/sec |
| Resolution | 12 dots/min | 16 dots/min |
| Drive Frequency | 780 Hz | 3,680 Hz |
| Dot Diameter | 70 μm | 50 μm |
| Focal Length | 150 mm | 200 mm |
| Scanning Length | 230 mm | 320 mm |
| Mirror Deflection Angle | 65° (P-P) | 70° (P-P) |
| Mirror (Transverse) Length | 5 mm | 9 mm |
| Mirror Shape | Ellipse | Ellipse |
| Deflection Angle of Recording Beam | 88° | 92° |

Table 5 enumerates the data of the various characteristics of the laser recording apparatus thus far described. In this Table, the "Type I" covers the maximum size of the recording paper up to the A4 size whereas the "Type II" covers the paper size A3.

The recording speed and the resolution will change depending upon the sizes of the recording paper. Thus, the drive frequency is suitably selected in accordance with the difference in those conditions.

In case, moreover, the recording paper has the different sizes, the deflection angle of the reflecting mirror is naturally changed to change the deflection angle of the recording beam.

Despite of this fact, however, the reflecting mirror 312 preferably has an elliptical shape in any event.

In the image recording apparatus, an image is formed by the scanning of the laser beam at a constant speed and the sub-scanning of the photosensitive drum rotated at a constant speed. Accordingly, if the scanning speed of the laser beam is varied by some reason, distortion due to the elongation or reduction of the image is occurred because the drum is rotated solely at the constant speed, so that no precise image can be formed.

In the present invention, on the contrary, the relation between the main scanning and the subscanning can be maintained constant and the clear image can always be recorded, because the drum can be rotated by the driving signal of the deflector.

Figure 16:
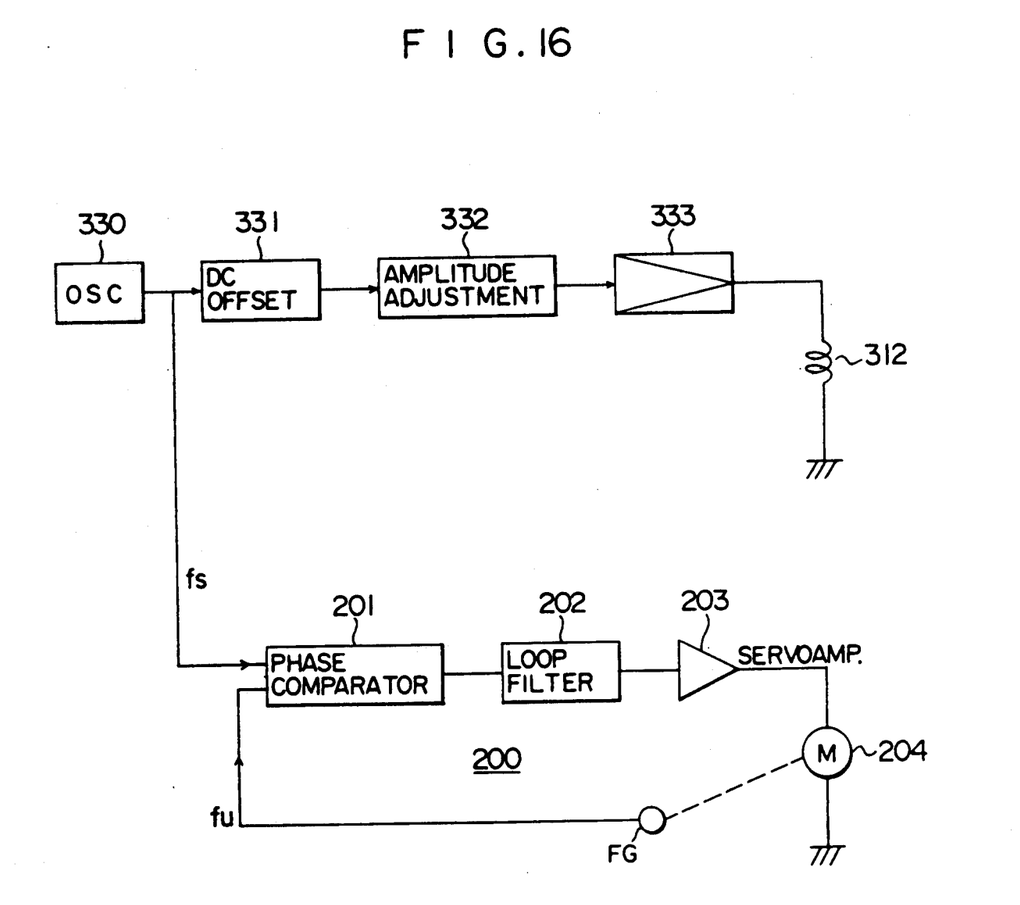
FIG. 16 is a block diagram of a drive circuit for the deflector and a PLL control circuit.

In FIG. 16, as the sinusoidal wave oscillator 330 an oscillator using an RC circuit or crystal oscillator can be used.

The output of the sinusoidal wave oscillator 330, that is, drive frequency is applied to the offset adjustor 331 in the next stage so that the DC offset thereof is adjusted.

A drive signal adjusted in DC offset and amplitude, respectively, is applied through the output amplifier 333 to said drive coil 312.

The photosensitive drum 11 which is the image retainer is rotated by a motor. In order to rotate the drum constant, a PLL control circuit 200 which is a kind of frequency feedback circuit is used. The PLL control can be attained as shown in FIG. 16 by a loop circuit consisting of a phase comparator 201, a loop filter 202, and an encoder FG for detecting the rotary speed of a drive motor 204 and generating an output frequency. The phase comparator 201 compares in phase a drive input signal $f_s$ with an output $f_u$ of the encoder FG and generates a difference signal voltage corresponding to the phase difference between the two signals. The loop filter 202 reduces the higher harmonic component so that the disturbing signal removing property can be enhanced. Further, even if the PLL control is unlocked by a noise etc., it is returned immediately to the lock state, because the previous voltage is accumulated. The difference signal passed through the loop filter 202 is amplified by a servoamplifier 203 to control the motor 204.

As stated above, the PLL control circuit 200 can control the rotation of the drive motor 204 according to the frequency of the drive input signal $f_s$, so that if the signal for driving said deflector 300 is used as the drive input signal $f_s$ to the PLL control circuit 200, the rotations of the deflector 300 and the photosensitive drum 11 are controlled always by the same signal and accordingly synchronized driving can be effected. In the present invention, if the drive signal for the deflector 300 is varied by some reason and accordingly the frequency of the drive signal is deviated from the resonance frequency, the input signal $f_s$ to the PLL control circuit 200 is also varied thereto to control suitably the motor 204 and the rotary portions, such as the drum 11 and developing devices etc., which are rotated through the pulley by the motor, so that a precise image can always be recorded.

In the present invention, an encoder FG using slit disk and light or the magnet can be adopted. The electronic circuit used in the present invention can be formed of normal IC or commercially available exclusive IC to simplify in construction.

Figure 10:
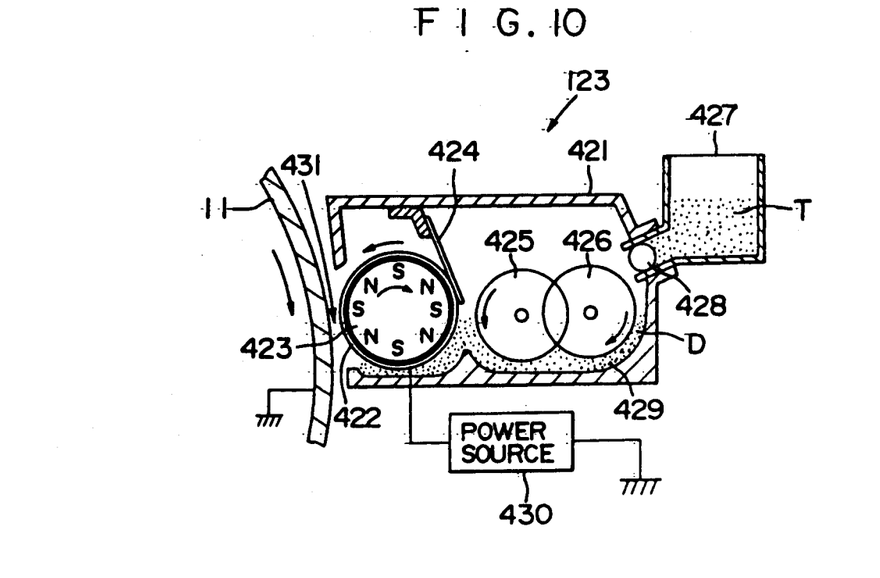
FIG. 10 is a sectional view showing one example of a developing device.

Incidentally, any of the developing devices 123 to 125 to be used in the laser recording apparatus shown in FIG. 1 is exemplified in FIG. 10. The fundamental structures of the developing devices 123 to 125 are substantially identical, and the structure of the developing device 123 will be described in the following.

Reference numeral 421 appearing in FIG. 10 designates a housing, in which is rotatably accommodated a cylindrical sleeve 422. This sleeve 422 is equipped therein with a magnetic roll 423 having eight N and S poles. A layer regulating member 424 is forced into contact with the outer circumference of the sleeve 422 so that the layer of a developer caught by the sleeve 422 may be regulated to have a predetermined thickness. This predetermined thickness has a value within a range of 10 to 500 μm.

First and second agitating members 425 and 426 are also accommodated in the housing 421. The developer D reserved in its reservoir 429 is sufficiently agitated and mixed by the coaction between the first agitating member 425 rotating in the counter-clockwise direction and the second agitating member 426 rotating in the opposite direction but in an overlapping manner. The developer D thus agitated and mixed is transported to stick to the surface of the sleeve 422 by the transporting forces of the sleeve 422 and the magnetic roll 423, which are rotating in the opposite directions to each other.

The developer D thus sticking to the image retainer 11 develops the electrostatic latent image on the image retainer 11 in the non-contact state.

During this development, moreover, a developing bias signal is fed from a power source 430 to the sleeve 422. This developing bias signal fed from the power source 430 is composed: of a DC component set at substantially the same potential as that of the non-exposed portion of the image retainer 11; and an AC component superposed on the DC component.

As a result, only the toner T of the developer D on the sleeve 422 is selectively moved and applied to the surface of the image retainer 11 made latent, thus effecting the development.

Incidentally, reference numeral 427 designates a supply toner container, and numeral 428 designates a toner supply roller. Numeral 431 designates a developing region.

The developer used is of two-component type. In the state of no developing bias applied, the toner T is caused to fly with the image retainer 11 and the developer D being out of contact and under the oscillating electric field generated by applying an AC bias, so that it may selectively stick to develop the electrostatic image of the image retainer 11. p In case this non-contact developing method is used, multi-color toner images composed of blue, red and black toner images are sequentially developed on the image retainer 11 with the advantages that the preceding toner image is not damaged by the succeeding one and that the thin-layer development can be carried out.

Now, in the aforementioned two-component developer is used, it can be made as thin as 2,000 μm or less, preferably 1,000 μm or less, specifically 10 to 500 μm, more specifically 10 to 400 μm, which is far thinner than that of the prior art. In this case, the development is accomplished with a small gap between the image retainer 11 and the sleeve 422.

Incidentally, even in case the bonding force between the carrier and toner of the developer or between the carrier and the sleeve 422 is weak, the toner sticks sufficiently to the sleeve 422 so that it will not scatter, because the developer layer is made remarkably thin.

If the developer layer is made thin to reduce the clearance between the image retainer 11 and the sleeve 22, the oscillating electric field required for flying the toner can be dropped. This makes it possible to drop the voltage of the developing bias.

From this point, therefore, the toner scatter can be reduced. Another advantage is that leakage, discharge and so on based on the developing bias from the sleeve surface can be suppressed.

In case, moreover, the clearance between the image retainer 11 and the sleeve 422 is reduced, the intensity of the electric field to be established by the latent image in the developing region 431 (i.e., the spacial region, in which the image retainer 11 and the sleeve 422 face), is increased so that a delicate change in the gradation and a fine pattern can be developed excellently.

If the developer layer is made thin, generally speaking, the quantity of the toner to be conveyed to the developing region is reduced. In order to increase this conveyance, it is effective to rotate the sleeve at a high speed.

If, however, the ratio of the linear velocity between the image retainer 11 and the sleeve 422 is 1:10, the parallel velocity component of the toner used for the development to the latent image surface is increased to establish a directivity in the development thereby to deteriorate the image quality.

This makes it necessary for the lower limit of the thin layer that the toner stick to the sleeve surface in a density of at least about 0.04 mg/cm². Generally speaking, the following conditions have to be satisfied for the linear velocity of the sleeve 422 at Vsl, the linear velocity of the image retainer 11 at Vd, and the toner quantity in the thin layer on the sleeve 422 at Mt:

$$|Vsl/Vd| \cdot Mt \geq 0.4 (mg/cm^2); \text{ and}$$
$$|Vsl/Vd| \leq 10.$$

If the developing efficiency is considered, the following conditions are preferable:

$$|Vsl/Vd| \cdot Mt \geq 0.5 (mg/cm^2); \text{ and}$$
$$|Vsl/Vd| \leq 8.$$

Moreover, the experimental results have revealed that the following conditions are more preferable:

$$|Vsl/Vd| \cdot Mt \geq 0.5 (mg/cm^2); \text{ and}$$
$$|Vsl/Vd| \leq 5.$$

The ratio between the toner and carrier in the developer at this time is desired such that the ratio in the total surface area between the toner and carrier in a unit volume be 0.5 to 2, as has been described hereinbefore.

Under the foregoing conditions specified above, the toner in the thin layer can be developed efficiently and stably to attain an excellent image quality.

The means for forming the thin developer layer is preferably exemplified by the layer regulating member 424 which is made of a pressure plate urged lightly to contact with the sleeve 422.

More specifically, this layer regulating member 424 is made of an elastic plate which is urged to have its leading end directed upwardly of the rotations of the sleeve 422. The developer is squeezed into a thin layer through a clearance between the sleeve 422 and the layer regulating member 424.

If the clearance between the layer regulating member 424 and the sleeve 422 is 0.08 mm or more, the toner can be fed stably at a constant rate irrespective of dispersions in the mounting or mechanical accuracy. Moreover, the clearance of 0.1 mm or more at the leading end is more preferable because of the increased stability.

It is quite natural that an aimless increase in the clearance at the leading end is not desirable. It was observed that all the uniformity of the developer was broken by the clearance of 5 mm or more.

Next, the developer layer thus thinned will develop the electrostatic image, which is conveyed to the developing region, in the non-contact manner. Then, it was found that the following conditioning equations had to be satisfied for achieving the desired development:

$$|(i \, Vsl - n\omega mh'/3)/Vd| \leq 10 \quad ...(1);$$

and $$|(Vsl - n\omega mh'/3)/Vd| \cdot mt \geq 0.4 (i \, mg/cm^2) \quad ...(2),$$

wherein:

Vsl: Linear velocity of sleeve (mm/sec);
n: Number of magnetic poles of magnetic roll;
$\omega$: Rotating angular velocity of magnetic roll (rads/sec);
h': Height of magnetic brush (mm);
Vd: Linear velocity of image retainer (mm/sec); and
mt: Amount of toner per unit area of sleeve (mg/cm²).

The linear velocity Vsl and the angular velocity $\omega$m are made positive if in the same direction with respect to the movement of the image retainer 11. On the other hand, the height of the magnetic brush is defined to mean the average height of that magnetic brush on the sleeve, which is erected on the magnetic poles in the sleeve. Specifically:

The linear velocity Vsl of the sleeve is 100 to 500 mm/sec;

The number n of the magnetic poles is 4 to 16;

The rotating angular velocity $\omega$m of the magnetic roll is 30 to 150 rad/sec;

The height h' of the magnetic brush is 50 to 400 μm;

The linear velocity Vd of the image retainer 11 is 30 to 150 mm/sec; and

The amount mt of the toner per unit area of the sleeve is 3 to 10 mg/cm.

These relations are criteria for achieving the preferable development but will change depending upon the clearance d between the image retainer 11 and the sleeve and the level of the bias voltage. The preferable developing conditions considering these factors are expressed as follows:

$$5 \leq Vp - p/d - h'' \leq 50 (i \, KV/mm) \quad ...(3),$$

wherein:
Vp−p: the inter-peak voltage of AC bias (KV);
d: the clearance between image retainer and sleeve (μm); and
h'': the Maximum height of magnetic brush (μm).

The maximum height of the magnetic brush is termed to mean the maximum height of the magnetic brush erected on the magnetic poles in the sleeve 422.

Incidentally, Table 6 enumerates the conditions of the individual parts in the development by the noncontact jumping. Table 7 enumerates a specific example of the developer. Table 8 enumerates the developing bias conditions at this time.

TABLE 6

| Image Forming Parts | Conditions |
| --- | --- |
| Image Retainer | Drum of 170 mmφ, Bis-azo Compound, Circumferential Speed of Photosensitive Member of 230 mm/sec |
| Charge | Scorotron Charger, Charge Potential of - 600 V, Exposed Portion Potential of - 50 V |
| Developing Method | Non-contact & Reversal Development, Two-component Developer |
| Developing Device (Developing Units) | 1st Unit (Containing Red Toner), 2nd Unit (Containing Blue Toner), 3rd Unit (Containing Black Toner) |
| Developing Device (Sleeve) | Diameter of 25 mmφ, 350 r.p.m. |
| Developing Device (Magnetic Roll) | 1,000 r.p.m., Intensity of Magnetic Poles of 700 G |
| Developing Order | Blue (2nd Developing Unit) → Red (1st Developing Unit) → Black (3rd Developing Unit) |
| Transfer | Electrostatic Transfer by Corona |

TABLE 6-continued

| Image Forming Parts | Conditions |
|---|---|
| Separation | Discharge Electrostatic Separation by AC Corona Discharge |
| Fixing | Fixing by Heated Roll at 160° C. (or at 200° C. with OHP), Temperature Detector by Thermistor |
| Cleaning | Blade of Urethane Rubber and Auxiliary Cleaning Roller of Sponge |

TABLE 7

| Developer | | Conditions | | | |
|---|---|---|---|---|---|
| | | Average particle Size $\mu m$ | Resistivity $\Omega$ cm | Charge Amount $\mu c/g$ | Toner Density $\Omega$ T |
| Carrier | | 40 | $10^{14}$ or more | Magneticism of 17 e.m.u./g, Ferrite Particles with Resin Coating | |
| Toner | Blue | 10 | $10^{14}$ or more | −12 | 10 |
| | Red | 11 | $10^{14}$ or more | −13 | 10 |
| | Black | 12 | $10^{14}$ or more | −12 | 10 |

TABLE 8

| Developer | | Conditions | | |
|---|---|---|---|---|
| | | Direct Current | Alternate Current f | P-P |
| Bias for Development | Blue Toner | −450 V | 3.5 kHz | 1.8 KV |
| | Red Toner | −450 V | 4.0 kHz | 2.0 KV |
| | Black Toner | −450 V | 4.0 kHz | 2.0 KV |
| Clearance (DSP) between Photosensitive Member and Sleeve | | | 500 $\mu m$ | |
| Thickness of Developer (Developing Region) | | | 300 $\mu m$ | |

Incidentally, in case the optical deflecting element 310 shown in FIG. 3 is used as the deflector 300, the reciprocal scan can be accomplished, as is different from the scan using the rotary polygon mirror. In case this reciprocal scan is adopted, the optical scanning system may have the structure shown in FIG. 11.

Figure 11:
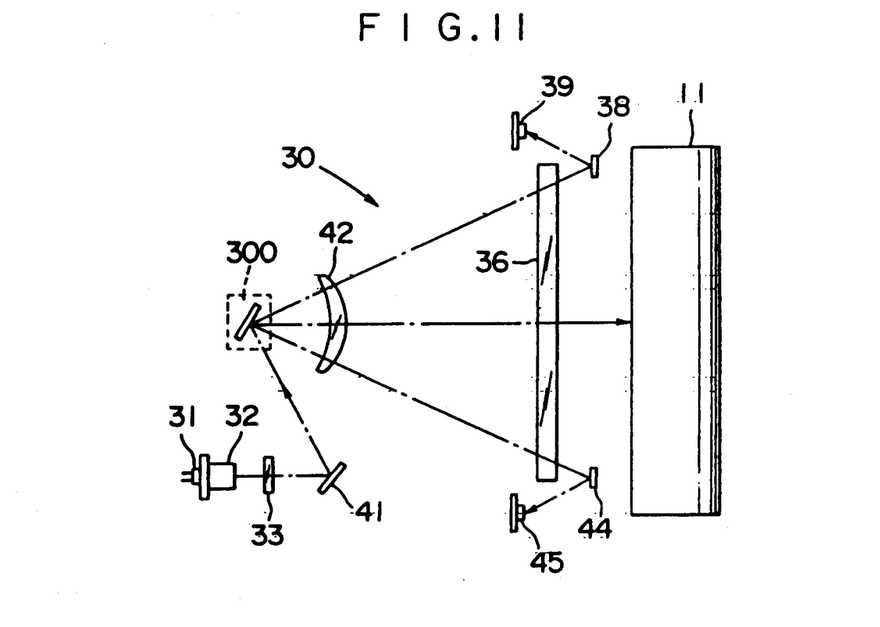
FIG. 11 is a diagram showing an optical system according to another example of FIG. 2.

By arranging the photosensors 39 and 45 upstream and downstream of the scanning direction, more specifically, the start and end (which may be the start because it is the return of the laser beam) of the scanning operation of the laser beam can be detected to record corresponding image informations on the image retainer 11.

Incidentally, reference numeral 44 appearing in FIG. 11 designates a reflecting mirror.

Now, the laser recording apparatus according to the present invention, as shown in FIG. 1, is applied to the simplified color image recording apparatus but can also be applied to a dichroic image recording apparatus.

Figure 12:
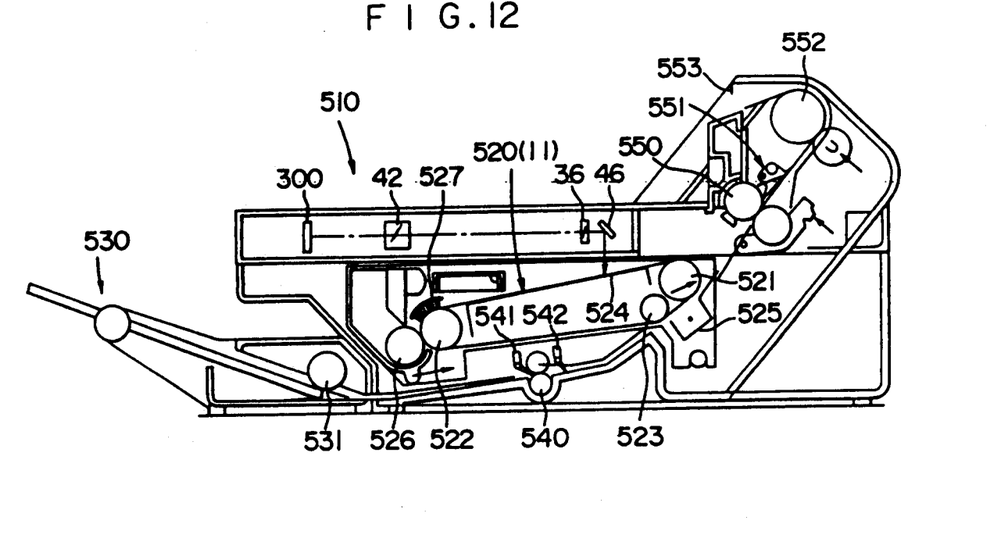
FIG. 12 is similar to FIG. 1 but shows another embodiment of the present invention.

FIG. 12 shows an embodiment of this dichroic image recording apparatus.

The laser beam modulated according to dichroic image signals is incident upon the deflector 300 disposed in an optical scanning system 510. The laser beam is then reflected by the surface of the reflecting mirror 312 to illuminate the circumference of the image retainer 11 through the scanning lens 42, the cylindrical lens 36 and a mirror 46.

The image retainer 11 is constructed of a photosensitive member 520 of endless belt shape, which is made to run counter-clockwise on the upper surface of a carriage 524 by three support rollers 521, 522 and 523. Upon this rotationary drive, the photosensitive member 520 has its surface charged in advance at a predetermined level by a charging transfer electrode 525 so that an electrostatic latent image corresponding to image informations is formed by the illumination of the aforementioned laser beam.

This electrostatic latent image is supplied with toner by a developing roller 526 functioning as the developing device so that it is formed into a toner image.

After this, the toner image is conveyed below the carriage 524. In this meanwhile, sheets of recording paper are introduced one by one from an automatic paper feeder 530 attached to the apparatus by the action of a paper feed roller 531. The leading end of each paper is detected by a sensor 541. In response to this detected output, a second paper feed roller 540 starts its rotations to feed the recording paper further. By the action of a sensor 542 having detected again the leading end of the paper, the second paper feed roller 540 is stopped. After the timing with the aforementioned toner image has been adjusted, the rotations of the second paper feed roller 540 is started again to continue the conveyance of the recording paper.

Thus, the photosensitive member 520 thus integrated with the recording paper transfers its toner image to the recording paper at the charging transfer electrode 525. This recording paper is then separated to have its charge eliminated when having its whole surface exposed to the laser beam. After this, the residual toner has its sticking force weakened by cleaning means 527 and is removed by the cleaning action of the developing roller 526.

Incidentally, the auxiliary cleaning means 527 is made of a brush composed of insulating fibers so that it exerts no trouble on the electricity of the electrostatic latent image formed in the preceding cycle.

Thus, the photosensitive member 520 is charged again by the charging transfer electrode 525 and is subjected to a subsequent rotating and conveying cycle so as to form a new electrostatic image. In this meanwhile, the recording paper to which the toner image is transferred is separated from the circumference of the photosensitive member 520 at the support roller 521. After this, the toner is melted and fixed to the recording paper at a fixing roller 550 and is then separated by a separating pawl 551 until it is guided onto a paper discharge roller 552. At the same time, the recording paper has its residual potential eliminated by an eliminating brush 553. As a result, the recording paper is discharged onto the discharge surface which is formed on the upper surface of the optical scanning system 510.

In this dichroic laser recording apparatus, too, the deflector 300 having the deflecting element 310 is used in the present invention.

As has been described hereinbefore, according to the present invention, a laser recording apparatus having far higher reliability and image quality than those of the prior art can be realized by using the deflector employing the deflecting element. The following advantages can be attained, as compared with the apparatus of the prior art.

(1) Since the deflector is very small-sized, the size of the apparatus can be reduced, as compared with the apparatus using the rotary polygon mirror. Since, moreover, the motor is not used as a rotating drive source, the deflecting oscillations can be realized always stably without noises even for a high-speed scanning operation.

(2) Not only a higher-speed scanning operation but also a small-sized deflector having a larger deflection angle can be realized than those of the apparatus using the mechanical oscillation mirror.

(3) Since the deflector is formed by the etching treatment, the product is highly accurate but without any dispersion. Since, moreover, the ligament is made of a material having a high modulus of elasticity, no metal fatigue is caused, which might otherwise be experienced by the metal rod used in the mechanical oscillation mirror, so that the stable operations can be expected for a long time.

Thus, the laser recording apparatus according to the present invention is highly reliable to provide a highly reliable recording apparatus.

(4) Since the deflecting element is integrally molded, a large deflection angle and a high intrinsic frequency can be attained so that the present invention can be appropriately applied to an apparatus using recording paper of large size for recording at a high speed.

(5) Since the surface of the reflecting mirror of the deflector is not so large as the beam spot, influences of the optical dispersion on the reflecting surface are not serious. Since, moreover, the deflector is integrally molded, the mirror oscillates stably even with changes in the ambient temperature and the environmental conditions. This ensures regular beam scanning operations. As a result, a satisfactory final image can always be obtained even for the high-speed recording operation.

As has been described hereinbefore, the present invention can be drastically appropriately applied to the laser recording apparatus such as a simplified color copying machine or a laser printer.

We claim:

1. A laser recording apparatus comprising:
   a deflector having a deflecting element for deflecting, in a predetermined direction, a laser beam modulated in accordance with image signals; and
   a beam correcting lens system interposed between said deflector and a recording medium so that said laser beam, deflected by said deflector, scans said recording medium through said lens system to write in said image signal,
   wherein said deflecting element is molded integrally of a frame, a reflecting mirror, a drive coil and a ligament, and said deflector is driven at or near a natural frequency of said deflecting element, and
   a length D in the main scanning direction at a laser beam reflecting surface of said reflecting mirror is selected to comply with the following formula, $$D \geq 1.64 \times (\lambda F/d \cos(i\ 1/4F + \alpha/2))$$

wherein $\lambda$ is a wavelength of laser beam, F is a focal length of a lens for scanning, d is a diameter of laser beam in the main scanning direction on the recording medium, and $\alpha$ is an angle of incident beam to the reflecting mirror with respect to an optical axis of reflecting beam.

2. A laser recording apparatus according to claim 1, wherein said deflecting element is made of a crystal base.

3. A laser recording apparatus according to claim 1, wherein said laser beam is scanned at a uniform rate by said beam correcting lens system.

4. A laser recording apparatus according to claim 2, wherein said deflector is driven at or in the vicinity of a frequency natural to said deflecting element.

5. The apparatus of claim 1, wherein the rotary speed of said recording medium is controlled based on a frequency of a signal for driving said deflector.

6. The apparatus of claim 1, wherein a length of an auxiliary scanning direction at the laser beam reflecting surface of said refection mirror is equal to or smaller than said length D in the main scanning direction.

7. The apparatus of claim 1, wherein said length D is 3 to 17 mm.

8. The apparatus of claim 5, wherein said length D is 3 to 10 mm.

* * * * *